United States Patent [19]

Iijima

[11] 4,441,928
[45] Apr. 10, 1984

[54] INK COMPOSITION

[75] Inventor: Zenshiro Iijima, Higashimurayama, Japan

[73] Assignee: Adger Kogyo Co., Ltd., Japan

[21] Appl. No.: 433,366

[22] Filed: Oct. 7, 1982

Related U.S. Application Data

[63] Continuation of Ser. No. 97,034, filed as PCT JP79/00080, Mar. 31, 1979, publish as WO79/00873, Nov. 1, 1979 § 102 (e) date Nov. 23, 1979, abandoned.

[30] Foreign Application Priority Data

Apr. 3, 1978 [JP] Japan ................................. 53-38927

[51] Int. Cl.$^3$ ............................................. C09D 11/00
[52] U.S. Cl. ......................................... 106/21; 106/22; 106/25; 106/26
[58] Field of Search .................... 106/21, 22, 25, 26

[56] References Cited

U.S. PATENT DOCUMENTS 3,926,645 12/1975 Strahl ................................... 106/21
4,070,194 1/1978 Arakawa ............................. 106/30
4,188,431 2/1980 Sokol et al. ........................... 428/29

Primary Examiner—John Kight, III
Assistant Examiner—Amelia B. Yarbrough
Attorney, Agent, or Firm—McGlew and Tuttle

[57] ABSTRACT

An ink composition containing an indicator of phthalein series colored by the conjoint use of an inorganic weakly basic substance and an organic amine. This ink composition shows a clear tint and possesses good stability so that it is free of fading on storage. Images produced with this ink composition can be erased by wiping them with a wet cloth, paper or other fibrous materials or by drying.

11 Claims, No Drawings

INK COMPOSITION

This is a continuation of application Ser. No. 097,034 filed as PCT JP 79/000 80, Mar. 31, 1979, publish as WO79/00873, Nov. 1, 1979 § 102 (e) date Nov. 23, 1979, now abandoned.

TECHNICAL FIELD

The present invention relates to an ink composition which affords erasable ink images possessing a clear tint. More particularly, the present invention relates to an erasable ink composition containing an indicator of phthalein series colored by the conjoint use of an inorganic weakly basic substance and an organic amine.

BACKGROUND ART

Indicators of phthalein series are widely utilized as acid-alkali indicators which are colorless or almost colorless on an acidic side but show a clear tint on an alkaline side.

The present invention continues a variety of researches to develop a series of erasable inks which can be erased by the action of water, heat, an acid or the like. At this time, he has made researches to develop erasable into using indicators of phthalein series as main ingredients. In case of indicators of phtahlein series, it is apparent that the colors are erasable with an acid. It has now been found with interest that images written with these indicators, such as letters or patterns, are erased when the indicators are diluted with water or when the images are dried after the lapse of a definite period of time. However, it has also been found that problems arise in case of coloring the indicators of phthalein series, because the use of a strong alkali rather renders the color so faded as to make the indicators impossible to be used as inks, and on the other hand, the use of a weak alkali imparts only a weak tint to the indicators thereby making them impossible to be used as inks capable of imparting a clear tint.

DISCLOSURE OF INVENTION

As a result of extensive researches made to overcome the above mentioned problems in case of using an indicator of phthalein series as ink, it has been found that a non-fading ink which shows a clear tint is obtained when the indicator of phthalein series is used jointly with an inorganic weakly basic substance such as an alkali carbonate and with an organic amine as basic substance. The present invention has been accomplished on the basis of the above finding.

In accordance with the present invention, there is provided an erasable ink composition characterized by containing an indicator of phthalein series colored by the conjoint use of an inorganic weakly basic substance and an organic amine.

Various known indicators of phthalein series are used as the main ingredient for the ink of the present invention. Illustrative of such indicators are, for example, α-naphtholphthalein, p-cresolphthalein, o-cresolphthalein, phenolphthalein, thymolphthalein, xylenolphthalein, dibromophenol-tetrabromophenylsulfophthalein and nitrophenolsulfophthalein. These indicators are colored in an alkaline pH range but are colorless or almost colorless in an acidic pH range. The indicators have a low solubility in water but their solubility can be enhanced by rendering the solution alkaline. The indicators are soluble in organic solvents such as an alcohol.

In the present invention, such indicator of phthalein series is colored by the conjoint use of an inorganic weakly basic substance and an organic amine and used as a main ingredient for the ink. In case of the indicators of phthalein series, the colors in the clearest state are obtained in strongly alkaline solutions of the indicators. Thus, the indicators show extremely clear tint in an aqueous solution of an alkali hydroxide. In such a strong alkaline solution, however, the indicators of phthalein series undergo changes in molecular structure during storage whereby the quinone-phenolate form is converted into the carbinol form in colorless state, and are thus unable to function as inks. On the other hand, the use of an inorganic weakly alkaline substance such as an alkali carbonate incurs considerable reduction in clearance of color, thus making it impossible to use the indicator as ink. Contrary to this, the conjoint use as a color-developer of the weakly basic substance and the organic amine according to the present invention solves theses problems and affords an ink which can withstand storage and show a clear tint.

The inorganic weakly basic substance used in the present invention is used herein to form the meaning of excluding strong alkalis such as sodium hydroxide and potassium hydroxide. Illustrative of such substance are alkali carbonates such as sodium carbonate and potassium carbonate, alkali sulfites such as sodium sulfite and potassium sulfite, alkali hydrogen phosphates such as sodium hydrogen phosphate and potassium hydrogen phosphate, alkali basic phosphates such as sodium phosphate and potassium phosphate, and alkali acetates such as sodium acetate and potassium acetate.

On the other hand, examples of the organic amine jointly used with the inorganic weakly basic substance include a variety of amines which are liquid at normal temperature, for example, aliphatic primary amines such as amylamine and monoethanolamine, aliphatic secondary amines such as diethylamine and dipropylamine, aliphatic tertiary amines such as triethanolamine and triethylamine, etc. These amines are used alone or in the form of a mixture, according to the desired color tone.

In the ink composition of the present invention, the indicator of phthalein series is used at a concentration of 0.1–10%, preferably 0.5–3% by weight in the solution, the inorganic weakly basic substance at a concentration of 0.5–20%, preferably 3–10% by weight and the organic amine at a concentration of 0.5–20%, preferably 3–15% by weight. The ink composition of the present invention may be incorporated with a moisture-absorbing substance such as glycerol or a drying-preventing substance such as an alkyleneglycol or polyalkyleneglycol as a color-controlling agent for adjusting the period of time until the color of written letters is erased. Lines and letters written with the ink composition of the present invention keep a color while the indicator of phthalein series contained therein is contacted with the alkaline substances and kept alkaline. However, the color of the written images gradually becomes dull and is finally decolored as the images become dry with the lapse or time to permit separation of the indicator of phthalein series from the alkaline substances. The moisture-absorbing or drying-preventing substance makes it possible to maintain the images in wet state thereby keeping the color for an extended period of time. The color-keeping time series according to the sort and concentration of the moisture-absorbing or drying-preventing substance used. In case of using the same moisture-absorbing substance, the color can be kept in a clear state for a more extended period of time by increasing the concentration thereof.

The ink composition of the present invention when diluted with water is suitable as an ink for sign-pen and ball-point pen. According to the intended use of the ink composition, a proper auxiliary additive, for example, a thickening agent such as starch, carboxymethylcellulose, gelatin or gum arabic can be added to the ink composition to use it as a printing ink or a stencil ink.

Images written on paper or cloth with the ink composition of the present invention can be erased by wiping the surface of the paper or cloth with a wet cloth to reduce or lose alkalinity of the written images or by leaving the images as they are to render them dry.

BEST MODE OF CARRYING OUT THE INVENTION

The present invention will now be illustrated in more detail by way of examples. It is to be construed, however, that the present invention is not limited to the specific embodiments illustrated herein.

EXAMPLE 1

In 60 cc of water were dissolved 5 g of anhydrous sodium carbonate, 0.2 g of o-cresolphthalein, 10 cc of triethanolamine and 30 cc of glycerol to make up a mixed solution. This solution showed purple red color and was used as an ink for a sign-pen. Letters and patterns were written on paper and cloth with this ink whereby images in purple red color were obtained. The images were erased when they were wiped with a wet cloth. Aside from this, the images similarly written were left as they were in the air whereby they were erased in 4-15 days although the period varied according to the sort of paper or cloth used.

EXAMPLE 2

In 70 cc of water were dissolved 10 g of sodium phosphate, 1 g of phenolphthalein, 15 cc of monoethanolamine and 15 cc of polyethyleneglycol is make up a mixed solution. This solution showed purple carmine color and was used as an ink for a sign-pen. Paper and cloth were written imagewise with this ink whereby images in purple carmine color were obtained. The images were erased when they were wiped with a wet cloth. Aside from this, images similarly written were left as they were in the air whereby they were erased in 2-10 days although the period varied according to the sort of paper or cloth used.

EXAMPLE 3

In 72 cc of water were dissolved 8 g of sodium acetate, 0.5 g of α-naphtholphthalein, 20 cc of ethyleneglycol and 8 cc of diethylamine to make up a mixed solution. This ink showed blue color and was used as an ink for a sign-pen. Paper and cloth were written imagewise with this ink whereby images in blue color were obtained. The images were erased when they were wiped with a wet cloth. Aside from this, images similarly written were left as they were in the air whereby they were erased in 7-20 days although the period varied according to the sort of paper or cloth used.

INDUSTRIAL APPLICABILITY

The ink composition of the present invention uses as a main ingredient the indicator of phthalein series colored by the conjoint use of the inorganic weakly basic substance and the organic amine. Thus, the color of the ink is clear and is not faded even after storage of the ink for a long period of time. The ink composition of the present invention can therefore be used directly as a writing ink or charged into sign-pens as writing goods like fountain pens, or can be incorporated with proper auxiliary additives to find the use as printing ink and the like. Further, the ink composition of the present invention has such a character that since the color is kept by alkali, the color can be erased by neutralizing, removing or diluting the alkali. Accordingly, the ink images obtained with this ink composition can be erased by either wiping their surface with a wet cloth or the like or drying them. Based on such peculiar property, the ink composition of the present invention is utilized in various fields.

I claim:

1. An erasable ink composition comprising an indicator of the phthalein series; an inorganic weakly basic substance which is selected from the group consisting of alkali carbonates, alkali sulfites, alkali hydrogen phosphates, alkali phosphates and alkali acetates; and an organic amine which is triethanolamine.

2. The composition of claim 1 wherein the contents by weight of the indicator, inorganic substance, and organic amine, are 0.1-10%, 0.5-20%, and 0.5-20%, respectively.

3. The composition of claim 1 further comprising a moisture absorbing agent which is selected from the group consisting of glycerol, alkyleneglycols and polyalkyleneglycols.

4. The composition of claim 1, further comprising a thickening agent which is selected from the group consisting of starch, carboxymethyl cellulose, gelatin and gum arabic.

5. An ink for sign-pens and ball-point pens containing the ink composition of claim 1.

6. The ink of claim 5 wherein the ink is a water containing ink.

7. An erasable ink composition comprising an indicator of the phthalein series; an inorganic weakly basic substance which is selected from the group consisting of alkali carbonates, alkali sulfites, alkali hydrogen phosphates, alkali phosphates and alkali acetates; an organic amine which is selected from the group consisting of amylamine, diethylamine, dipropylamine, triethylamine and triethanolamine; and a moisture absorbing agent which is selected from the group consisting of glycerol, alkyleneglycols and polyalkyleneglycols.

8. The composition of claim 7 wherein 0.1-10% of the indicator, 0.5-20% of the inorganic substance, and 0.5-20% of the organic amine are present by weight.

9. The composition of claim 7 further comprising a thickening agent which is selected from the group consisting of starch, carboxymethyl cellulose, gelatin and gum arabic.

10. An ink for sign-pens and ball-point pens containing the ink composition of claim 7.

11. The ink of claim 10 wherein the ink is a water containing ink.

* * * * *